United States Patent
Baniel et al.

(10) Patent No.: US 9,215,133 B2
(45) Date of Patent: Dec. 15, 2015

(54) METHODS, SYSTEMS, AND COMPUTER READABLE MEDIA FOR DETECTING ORPHAN SY OR RX SESSIONS USING AUDIT MESSAGES WITH FAKE PARAMETER VALUES

(71) Applicant: Tekelec, Inc., Morrisville, NC (US)

(72) Inventors: Uri Baniel, Buffalo Grove, IL (US); Tarek Abou-Assali, Boston, MA (US); Manish Kumar Gupta, Pennington, NJ (US); Sayan Chowdhury, Somerville, MA (US)

(73) Assignee: Tekelec, Inc., Morrisville, NC (US)

( * ) Notice: Subject to any disclaimer, the term of this patent is extended or adjusted under 35 U.S.C. 154(b) by 191 days.

(21) Appl. No.: 13/772,286

(22) Filed: Feb. 20, 2013

(65) Prior Publication Data
US 2014/0233368 A1  Aug. 21, 2014

(51) Int. Cl.
*G01R 31/08* (2006.01)
*H04L 12/24* (2006.01)
*H04L 12/26* (2006.01)
*H04L 12/14* (2006.01)
*H04L 29/06* (2006.01)

(52) U.S. Cl.
CPC ........ *H04L 41/0654* (2013.01); *H04L 12/1407* (2013.01); *H04L 43/50* (2013.01); *H04L 65/105* (2013.01); *H04L 65/1016* (2013.01); *H04L 65/1076* (2013.01); *H04L 65/80* (2013.01)

(58) Field of Classification Search
CPC .................................................. H04L 41/0654
USPC ........................................................ 370/216
See application file for complete search history.

(56) References Cited

U.S. PATENT DOCUMENTS

| 7,257,636 | B2 | 8/2007 | Lee et al. |
| 8,042,148 | B2 | 10/2011 | Andreasen et al. |
| 8,131,831 | B1 | 3/2012 | Hu |
| 8,640,188 | B2 | 1/2014 | Riley et al. |

(Continued)

FOREIGN PATENT DOCUMENTS

| CN | 101272256 A | 9/2008 |
| CN | 101296509 A | 10/2008 |

(Continued)

OTHER PUBLICATIONS

Non-Final Official Action for U.S. Appl. No. 12/973,186 (Aug. 24, 2012).

(Continued)

*Primary Examiner* — Gerald Smarth
(74) *Attorney, Agent, or Firm* — Jenkins, Wilson, Taylor & Hunt, P.A.

(57) ABSTRACT

A policy and charging rules function (PCRF), generates a Diameter audit message concerning an application level Diameter session for which local resources are maintained by the PCRF. The PCRF includes, in the audit message, a fake parameter value. The PCRF sends the audit message with the fake parameter value to the OCS or the AF over an Sy or Rx interface. The PCRF receives a response to the audit message from the OCS or AF. The PCRF determines, based on the response, whether the application level session comprises and orphan session. The PCRF, in response to determining that the application level Diameter session comprises an orphan session frees the local resources maintained by the PCRF for the orphan session.

9 Claims, 8 Drawing Sheets

(56) References Cited

U.S. PATENT DOCUMENTS

| | | | |
|---|---|---|---|
| 8,787,174 B2 | 7/2014 | Riley et al. | |
| 8,813,168 B2 | 8/2014 | Riley et al. | |
| 8,943,209 B2 | 1/2015 | Cervenak et al. | |
| 2003/0003928 A1 | 1/2003 | Marjelund et al. | |
| 2005/0022115 A1* | 1/2005 | Baumgartner et al. | 715/513 |
| 2005/0107091 A1 | 5/2005 | Vannithamby et al. | |
| 2005/0122945 A1 | 6/2005 | Hurtta | |
| 2007/0094712 A1 | 4/2007 | Gibbs et al. | |
| 2007/0195788 A1 | 8/2007 | Vasamsetti et al. | |
| 2007/0226775 A1 | 9/2007 | Andreasen et al. | |
| 2007/0242692 A1 | 10/2007 | Limb et al. | |
| 2007/0286117 A1 | 12/2007 | Balasubramanian et al. | |
| 2008/0046963 A1 | 2/2008 | Grayson et al. | |
| 2008/0120700 A1 | 5/2008 | Pandey et al. | |
| 2008/0250156 A1 | 10/2008 | Agarwal et al. | |
| 2008/0271113 A1 | 10/2008 | Belling | |
| 2008/0310334 A1 | 12/2008 | Nakamura et al. | |
| 2009/0080440 A1 | 3/2009 | Balyan et al. | |
| 2009/0109845 A1 | 4/2009 | Andreasen et al. | |
| 2009/0129271 A1 | 5/2009 | Ramankutty et al. | |
| 2009/0141625 A1 | 6/2009 | Ghai et al. | |
| 2009/0156213 A1 | 6/2009 | Spinelli et al. | |
| 2009/0177650 A1 | 7/2009 | Petersson et al. | |
| 2009/0227231 A1 | 9/2009 | Hu et al. | |
| 2009/0307028 A1 | 12/2009 | Eldon et al. | |
| 2010/0020812 A1 | 1/2010 | Nakamura et al. | |
| 2010/0027448 A1 | 2/2010 | Puthiyandyil et al. | |
| 2010/0048161 A1 | 2/2010 | He et al. | |
| 2010/0154031 A1 | 6/2010 | Montemurro et al. | |
| 2010/0185488 A1 | 7/2010 | Hogan et al. | |
| 2010/0188975 A1 | 7/2010 | Raleigh | |
| 2010/0284336 A1 | 11/2010 | Rui et al. | |
| 2010/0286490 A1* | 11/2010 | Koverzin | 600/301 |
| 2010/0299451 A1 | 11/2010 | Yigang et al. | |
| 2010/0311392 A1 | 12/2010 | Stenfelt et al. | |
| 2010/0312740 A1 | 12/2010 | Clemm et al. | |
| 2010/0329243 A1 | 12/2010 | Buckley et al. | |
| 2010/0329244 A1 | 12/2010 | Buckley et al. | |
| 2011/0075557 A1 | 3/2011 | Chowdhury et al. | |
| 2011/0075675 A1 | 3/2011 | Koodli et al. | |
| 2011/0122870 A1 | 5/2011 | Dixon et al. | |
| 2011/0141947 A1 | 6/2011 | Li et al. | |
| 2011/0167471 A1 | 7/2011 | Riley et al. | |
| 2011/0199903 A1 | 8/2011 | Cuervo | |
| 2011/0208853 A1 | 8/2011 | Castro-Castro et al. | |
| 2011/0211465 A1 | 9/2011 | Farrugia et al. | |
| 2011/0238547 A1 | 9/2011 | Belling et al. | |
| 2011/0296489 A1 | 12/2011 | Fernandez Alonso et al. | |
| 2011/0302289 A1 | 12/2011 | Shaikh et al. | |
| 2011/0320323 A1 | 12/2011 | Cuervo | |
| 2011/0320544 A1* | 12/2011 | Yee et al. | 709/206 |
| 2012/0005357 A1 | 1/2012 | Hellgren | |
| 2012/0014332 A1 | 1/2012 | Smith et al. | |
| 2012/0084425 A1 | 4/2012 | Riley et al. | |
| 2012/0096177 A1 | 4/2012 | Rasanen | |
| 2012/0102174 A1 | 4/2012 | Zhou et al. | |
| 2012/0202491 A1 | 8/2012 | Fox et al. | |
| 2012/0221899 A1* | 8/2012 | Cervenak et al. | 714/48 |
| 2012/0314632 A1 | 12/2012 | Martinez De La Cruz et al. | |
| 2013/0262308 A1* | 10/2013 | Cai et al. | 705/44 |
| 2014/0086052 A1* | 3/2014 | Cai et al. | 370/235 |

FOREIGN PATENT DOCUMENTS

| | | |
|---|---|---|
| EP | 1 988 680 A1 | 11/2008 |
| EP | 2 093 931 A1 | 8/2009 |
| EP | 1 988 680 B1 | 3/2010 |
| WO | WO 2008/132100 A1 | 11/2008 |
| WO | WO 2009/058067 A1 | 5/2009 |
| WO | WO 2009/149341 A2 | 12/2009 |
| WO | WO 2010/086013 A1 | 8/2010 |
| WO | WO 2010/088085 A1 | 8/2010 |
| WO | WO 2010/142327 A1 | 12/2010 |
| WO | WO 2011/082035 A2 | 7/2011 |
| WO | WO 2011/082036 A2 | 7/2011 |

OTHER PUBLICATIONS

Notification of Transmittal of the International Search Report and the Written Opinion of the International Searching Authority, or the Declaration for International Patent Application No. PCT/US2010/061589 (Sep. 26, 2011).

"3rd Generation Partnership Project; Technical Specification Group Core Network and Terminals; Policy and Charging Control over Rx reference point (Release 11)," 3GPP TS 29.214 V11.7.0, pp. 1-53 (Dec. 2012).

Fajardo et al., "Diameter Base Protocol," RFC 6733, pp. 1-152 (Oct. 2012).

"Digital cellular telecommunications system (Phase 2+); Universal Mobile Telecommunications System (UMTS); LTE; Policy and charging control: Spending limit reporting over Sy reference point (3GPP TS 29.219 version 11.2.0 Release 11)," ETSI TS 129 219 V11.2.0, pp. 1-22 (Oct. 2012).

Notice of Allowance and Fee(s) Due for U.S. Appl. No. 13/244,259 (Oct. 3, 2014).

Final Office Action for U.S. Appl. No. 13/244,259 (Jul. 8, 2014).

Non-Final Office Action for U.S. Appl. No. 13/244,259 (Dec. 16, 2013).

Liebsch et al., "Diameter General Purpose Session," draft-liebsch-dime-diameter-gps-00.txt (Jun. 29, 2010).

Calhoun et al., "Diameter Base Protocol," RFC 3588, pp. 1-147 (Jun. 29, 2010).

"3rd Generation Partnership Project; Technical Specification Group Services and System Aspects; Telecommunication management; Charging management; Diameter charging applications (Release 9)," 3GPP TS 32.299, V9.4.0, pp. 1-148 (Jun. 2010).

"3rd Generation Partnership Project; Technical Specification Group Core Network and Terminals; IP Multimedia (IM) Subsystem Sh interface; Signalling flows and message contents (Release 9)," 3GPP TS 29.328, V9.2.0, pp. 1-49 (Jun. 2010).

Znaty, "Diameter, GPRS, (LTE+ePC=EPS), IMS, PCC and SDM," EFORT (May 2010). (Part 1 of 2, pp. 1-229).

Znaty, "Diameter, GPRS, (LTE+ePC=EPS), IMS, PCC and SDM," EFORT (May 2010). (Part 2 of 2, pp. 230-460).

"3rd Generation Partnership Project; Technical Specification Group Core Network and Terminals; Study on PCRF failure and restoration (Release 9)," 3GPP TR 29.816 V1.1.0, pp. 1-60 (May 2010).

"3rd Generation Partnership Project; Technical Specification Group Core Network and Terminals; Policy and Charging Control over Gx reference point (Release 9)," 3GPP TS 29.212 V9.2.0, pp. 1-111 (Mar. 2010).

Sou et al., "Design and Implementation of Policy and Charging Control System for Advanced Mobile Services," ICIS, IEEE (2009).

Pencheva et al., "Web Services for Quality of Service Monitoring," IEEE (2009).

Pencheva et al., "Cross Layer Design of Application-level Resource Management Interfaces," IEEE (2009).

"Universal Mobile Telecommunications System (UMTS); Policy and charging control over Rx reference point (3GPP TS 29.214 version 7.4.0 Release 7)," ETSI TS 129 214, V7.4.0, pp. 1-38 (Apr. 2008).

"3rd Generation Partnership Project; Technical Specification Group Services and System Aspects; Policy and charging control architecture (Release 8)," 3GPP TS 23.203 V8.1.1, pp. 1-87 (Mar. 2008).

Bengtsson et al., "How to Enable Better Service Assurance Using the PCRF," Master of Science Thesis, KTH Computer Science (2006).

"3rd Generation Partnership Project; Technical Specification Group Core Network and Terminals; Charging rule provisioning over Gx interface (Release 9)," 3GPP TS 29.210, V6.7.0, pp. 1-21 (Dec. 2006).

Aboba et al., "Authentication, Authorization and Accounting (AAA) Transport Profile," RFC 3539, pp. 1-41 (Jun. 2003).

Notification of the First Office Action for Chinese Application No. 201080064945.X (Sep. 17, 2014).

(56) References Cited

OTHER PUBLICATIONS

Communication of extended European Search Report for European Patent Application No. 10841576.1 (May 9, 2014).
Notice of Allowance and Fee(s) Due for U.S. Appl. No. 13/157,052 (Apr. 14, 2014).
Notice of Allowance and Fee(s) Due for U.S. Appl. No. 12/973,228 (Mar. 20, 2014).
Applicant-Initiated Interview Summary and Advisory Action Before the Filing of an Appeal Brief for U.S. Appl. No. 13/157,052 (Mar. 17, 2014).
Final Office Action for U.S. Appl. No. 13/157,052 (Jan. 2, 2014).
Non-Final Office Action for U.S. Appl. No. 12/973,228 (Oct. 25, 2013).
Notice of Allowance and Fee(s) Due for U.S. Appl. No. 12/973,186 (Sep. 19, 2013).
Final Office Action for U.S. Appl. No. 12/973,228 (Jun. 21, 2013).
Non-Final Office Action for U.S. Appl. No. 13/157,052 (Jun. 6, 2013).
Final Office Action for U.S. Appl. No. 12/973,186 (May 22, 2013).
Non-Final Office Action for U.S. Appl. No. 12/973,228 (Feb. 1, 2013).
Communication of European Publication Number and Information on the Application of Article 67(3) EPC for European Patent Application No. 10841576.1 (Oct. 10, 2012).
Notification of Transmittal of the International Search Report and the Written Opinion of the International Searching Authority, or the Declaration for International Patent Application No. PCT/US2010/061586 (Sep. 26, 2011).
"Smart Cards; Card Application Toolkit (CAT) (Release 9)," ETSI TS 102 223 V9.2.0, pp. 1-209 (Oct. 2010).
3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).
3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).
3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).
3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).
3GPP, "3rd Generation Partnership Project; Technical Specification Group Core Network and Terminals; Non-Access-Stratum (NAS) Functions Related to Mobile Station (MS) in Idle Mode (Release 10)," 3GPP TS 23.122 v10,0.0, pp. 1-41 (Jun. 2010).
3GPP, "Universal Mobile Telecommunications System (UMTS); LTE; 3GPP Evolved Packet System(EPS); Evolved General Packet Radio Service (GPRS) Tunnelling Protocol for Control Plane (GTPv2-C); Stage 3 (3GPP TS 29.274 version 9.3.0 Release 9)," ETSI TS 129 274 V9.3.0, pp. 1-162 (Jun. 2010).
"Universal Mobile Telecommunications System (UMTS); LTE; Policy and Charging Control over Gx Reference Point (3GPP TS 29.212 version 9.2.0 Release 9)," ETIS TS 129 212 V9,2.0, pp. 1-115 (Apr. 2010).
3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).

\* cited by examiner

200~# METHODS, SYSTEMS, AND COMPUTER READABLE MEDIA FOR DETECTING ORPHAN SY OR RX SESSIONS USING AUDIT MESSAGES WITH FAKE PARAMETER VALUES

TECHNICAL FIELD

The subject matter described herein relates to auditing Sy or Rx sessions. More particularly, the subject matter described herein relates to detecting orphan Sy or Rx sessions using audit messages with fake parameter values.

BACKGROUND

In Diameter networks, sessions are often established between policy and charging rules functions (PCRFs) and other nodes. For example, PCRFs establish Sy sessions with online charging systems (OCSs) to monitor policy counters, which govern subscriber spending limits with regard to one or more services. The PCRF makes policy decisions based on the status of the policy counters received from the OCS. On the Rx interface, the PCRF sends re-authorization request (RAR) messages to application functions (AFs) to re-establish sessions with the application functions.

The PCRF reserves memory and other resources associated with each session on each interface that the PCRF supports. If a session is terminated by the OCS or AF, the PCRF may not be aware of the termination. A session that is terminated by the remote end but where the PCRF is not aware of the termination is referred to herein as an orphan session. As the number of sessions managed by the PCRF increases, wasted resources due to orphan sessions can degrade PCRF performance.

The Sy and Rx interface specifications to not define procedures for detecting orphan sessions. One possible procedure for detecting orphan sessions could be to use an existing message on one of the interfaces to audit sessions. However, if an existing message is used to audit sessions, that message can trigger undesirable results, such as a subscription to future updates. For example, on the Sy interface, if a spending limit request with a valid policy counter identifier is used as an audit message, sending such a message to the OCS will result the PCRF receiving policy counter updates for the session. An audit procedure that triggers a subscription and future updates is undesirable as such a procedure further wastes PCRF and OCS resources. The base Diameter protocol includes keepalive timers and related procedures for Diameter messages. However, such procedures only test the availability or unavailability of Diameter communications, which could represent hundreds or thousands of sessions and is thus unsuitable for detecting individual orphan sessions.

Accordingly, there exists a need for methods, systems, and computer readable media for detecting orphan Sy or Rx sessions using audit messages with fake parameters

SUMMARY

The subject matter described herein includes methods, systems and computer readable media for detecting orphan Sy or Rx sessions using audit messages with fake parameter values. One exemplary method includes, at a policy and charging rules function (PCRF), generating a Diameter audit message concerning an application level Diameter session for which the PCRF maintains local resources. The method further includes including, in the audit message, at least one fake parameter value. The method further includes sending the audit message with the fake parameter value to the OCS or the AF over an SY or RX interface. The method further includes receiving a response to the audit message from the OCS or AF. The method further includes determining, based on the response, whether the application level session comprises and orphan session. The method further includes, in response to determining that the application level Diameter session comprises an orphan session freeing the local resources maintained by the PCRF for the orphan session.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

The subject matter described herein includes methods, systems, and computer readable media for detecting orphan sessions using fake parameter values. In one embodiment, a PCRF may implement an auditing procedure for detecting orphan sessions on the Sy interface by using an existing Sy protocol message with a fake parameter value to audit sessions with an OCS. As used herein, the term "fake parameter value" refers to any of the following: a valid value for an existing parameter, an invalid value for an existing parameter, or a new parameter (and associated new parameter value), which triggers the receiving node to respond with a message from which the auditing node can identify the session as an orphan session or not and without triggering a subscription. For example, on the Sy interface, the spending limit request message is used by the PCRF to determine the spending limit associated with a particular session. The spending limit request includes a value referred to as the policy counter identifier which identifies a policy counter that defines bandwidth to be allocated to a subscriber for a particular type of traffic. For example, the policy counter may indicate that the subscriber has 2 gigabytes of bandwidth per month for Internet traffic. The spending limit request message may also include an update request, which triggers the OCS to send the PCRF updates in the amount of bandwidth remaining for the subscriber. Using such a message as an audit message would be undesirable as receiving updates for each session being audited would waste OCS and PCRF resources.

Figure 1:
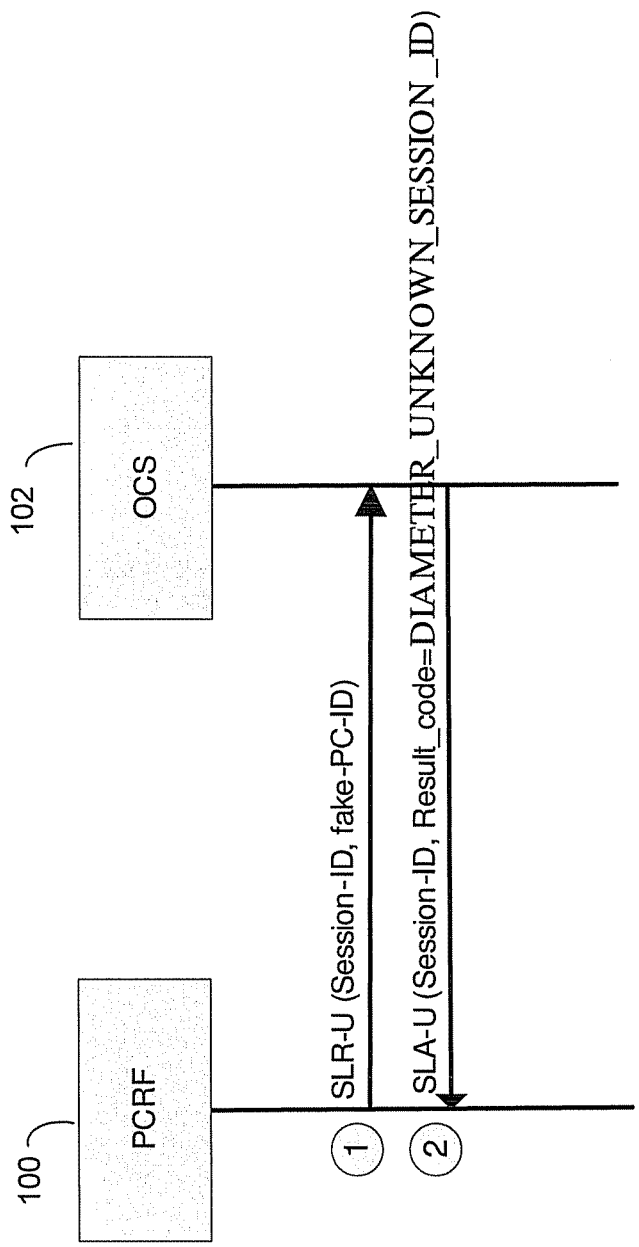
FIG. 1 is a message flow diagram illustrating messaging between a PCRF and an OCS for detecting orphan sessions on the Sy interface according to an embodiment of the subject matter described herein.

In light of this difficulty, in one embodiment, the PCRF may utilize an existing spending limit request message with a fake policy counter identifier to trigger the OCS to respond but not to trigger a subscription as the fake policy counter identifier would not trigger such a subscription. FIG. 1 is a message flow diagram illustrating exemplary messaging between the PCRF and the OCS in auditing an Sy session. Referring to FIG. 1, in step 1, PCRF 100 sends a spending limit request message to OCS 102. The spending limit request message may include a session identifier and a fake policy counter identifier. Table 1 shown below illustrates exemplary parameters that may be included in the spending limit request message.

TABLE 1

Exemplary Spending Limit Request Parameters

| AVP | Value |
| --- | --- |
| Session-Id | Sy.Op.com; 1876543210; 102 |
| Origin-Host | PCRF.Op.com |
| Origin-Realm | Op.com |
| Destination-Realm | Op.com |
| Auth-Application-Id | 16777302 |
| SL-Request-Type | UPDATE_REQUEST |
| Destination-Host | ocs.Op.com |
| Policy-Counter-Identifier | Fake PC ID |

In Table 1, the session ID Sy.Op.com;1876543210;102 corresponds to a session that PCRF 100 believes to be active and for which PCRF 100 is currently reserving resources. The policy counter identifier in Table 1 may be fake value that is out of range for valid policy counter identifiers for that particular session.

In this example, the session is an orphan session because is OCS 102 has ceased to maintain state associated with the session. OCS 102 may cease maintaining a state, for example, if there is an error associated with the OCS 102, such as a reboot that causes loss of session data. In step 2 of the message flow in FIG. 1, OCS 102 sends a spending limit answer message with a result code indicating that the session ID is unknown. Table 2 shown below illustrates exemplary parameters that may be included in the spending limit answer message.

TABLE 2

Exemplary Spending Limit Answer Parameters for Unknown Session

| AVP | M/O | Description |
| --- | --- | --- |
| Session-Id | M | Sy.Op.com; 1876543210; 102 |
| Result-Code | M | DIAMETER_UNKNOWN_SESSION_ID |
| Origin-Host | M | ocs.Op.com |
| Origin-Realm | M | Op.com |
| Auth-Application-Id | M | 16777302 |

In Table 2, the result code of the spending limit answer messages Diameter unknown session ID. Such a code may notify a PCRF that the session is no longer active. Accordingly, PCRF 100 may free resources associated with the session.

Figure 2:
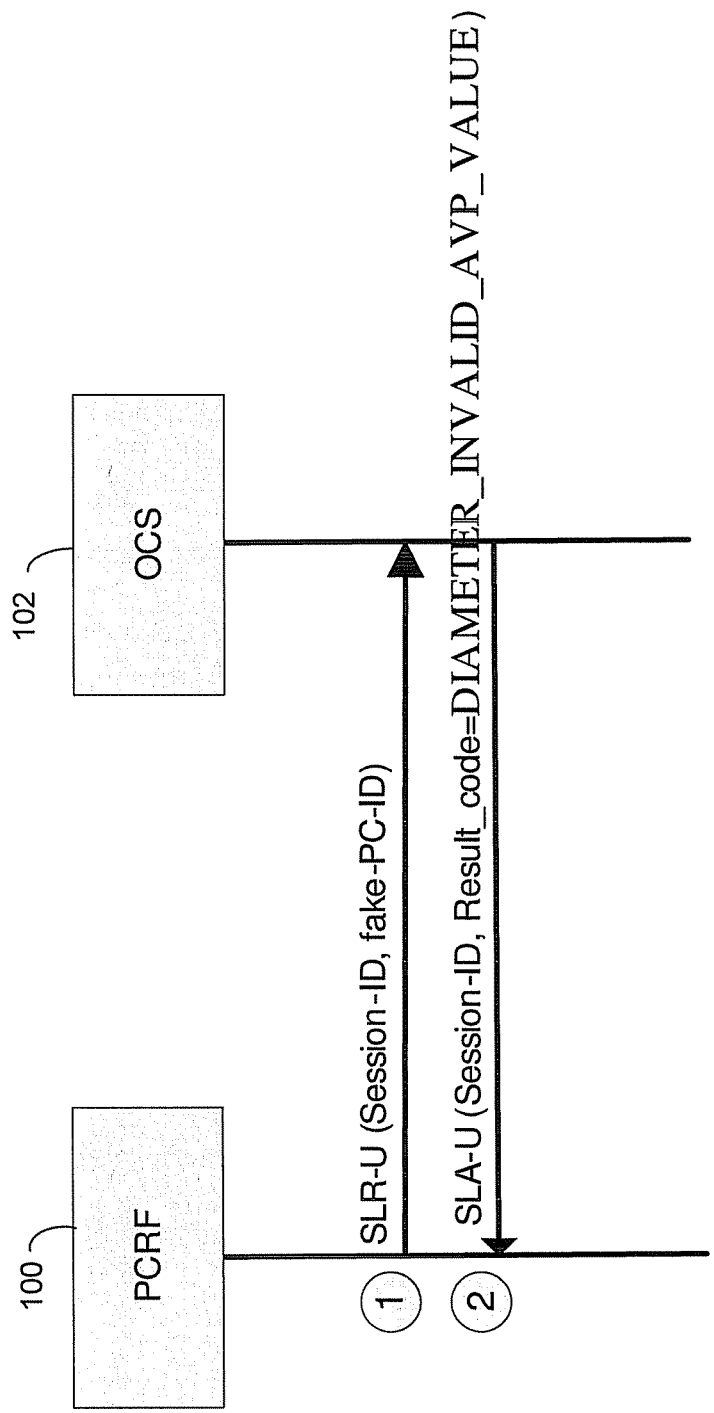
FIG. 2 is a message flow diagram illustrating further messaging between a PCRF and an OCS for detecting orphan sessions on the Sy interface according to an embodiment of the subject matter described herein.

In the example illustrated in FIG. 1, because the session was no longer active, the fake policy counter identifier did not have any effect on processing performed by OCS 102. However, if a session is valid, the fake policy counter identifier may prevent the OCS from initiating a subscription in response to a spending limit request message from PCRF 100. FIG. 2 illustrates this case. Referring to FIG. 2, in step 1, PCRF 100 sends a spending limit request message with a fake policy counter identifier to OCS 102. In this example, it is assumed that the session is a valid session being maintained by OCS 102 and that the fake policy counter identifier is out of range for that session. Table 3 shown below illustrates exemplary parameters that may be included in the spending limit request message.

TABLE 3

Exemplary Spending Limit Request Parameters

| AVP | Value |
| --- | --- |
| Session-Id | Sy.Op.com; 1876543210; 102 |
| Origin-Host | PCRF.Op.com |
| Origin-Realm | Op.com |
| Destination-Realm | Op.com |
| Auth-Application-Id | 16777302 |
| SL-Request-Type | UPDATE_REQUEST |
| Destination-Host | ocs.Op.com |
| Policy-Counter-Identifier | Fake PC ID Value |

In Table 3, the session ID in the spending limit request message is assumed to correspond to a valid session being maintained by OCS 102. The policy counter identifier is assumed to be a fake value. Accordingly, in step 2 of the message flow diagram, OCS 102 sends a spending limit answer message to PCRF 100. The spending limit answer message includes the session identifier and has a result code indicating that the fake policy counter identifier is an invalid value. Table 4 shown below illustrates exemplary parameters that may be included in the spending limit answer message.

TABLE 4

Exemplary Spending Limit Answer Message Parameter Values

| AVP | M/O | Description |
| --- | --- | --- |
| Session-Id | M | Sy.Op.com; 1876543210; 102 |
| Result-Code | M | DIAMETER_INVALID_AVP_VALUE |
| Origin-Host | M | ocs.Op.com |

TABLE 4-continued

Exemplary Spending Limit Answer Message Parameter Values

| AVP | M/O | Description |
| --- | --- | --- |
| Origin-Realm | M | Op.com |
| Auth-Application-Id | M | 16777302 |

From Table 4, it can be seen that the spending limit answer message indicates a valid session identifier but an invalid AVP (attribute value pair) value. As such, the spending limit answer message is interpreted by PCRF 100 to be a response to an audit request for that session and indicates that the session is still active. Accordingly, PCRF 100 may maintain its resources associated with the particular session. Because the policy counter identifier sent to OCS 102 is invalid, no unnecessary subscription is triggered by the spending limit request message.

Figure 3:
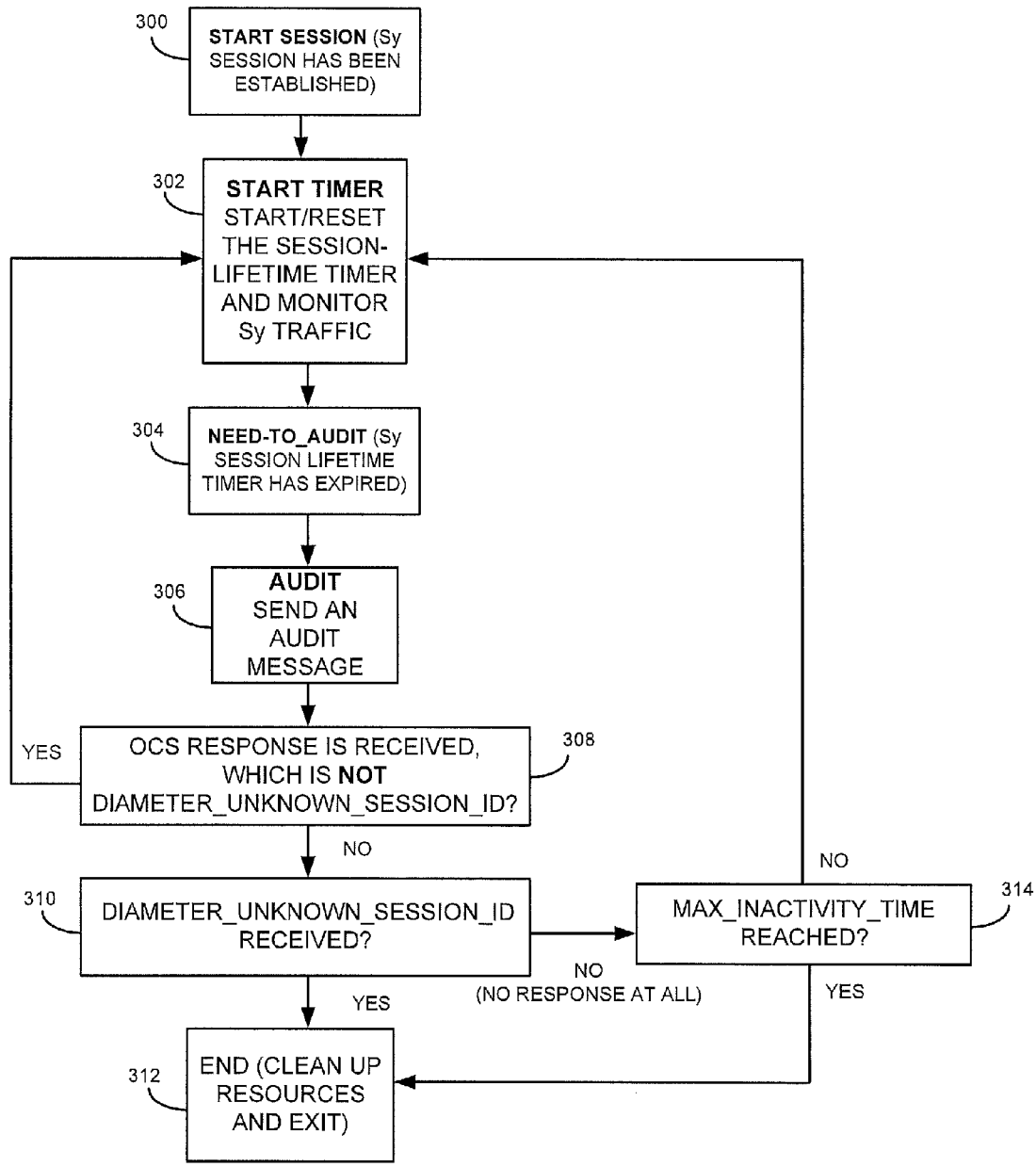
FIG. 3 is a state diagram illustrating exemplary steps performed by a PCRF in detecting orphan sessions on the Sy interface according to an embodiment of the subject matter described herein.

FIG. 3 is a state diagram illustrating exemplary states that may be implemented by PCRF 100 in detecting orphan sessions on the Sy interface. Referring to FIG. 3, in state 300, PCRF 100 establishes an Sy session with OCS 102. In state 302, PCRF 100 starts a session lifetime timer associated with the session and monitors Sy traffic. If no traffic is received within a predetermined time period, the session lifetime timer expires and PCRF 100 transitions to the need to audit state 304 and then to state 306, where PCRF 100 sends an audit message to OCS 102 to audit the session.

If, in state 306, an OCS message is received that indicates that the session is not unknown, as indicated by state 308, control returns to state 302 where the session lifetime timer is reset. If a response is received that indicates that the session is unknown, as indicated by state 310, control proceeds to state 312 where the PCRF 100 frees resources associated with the session. If no response to the audit message is received, control proceeds to step 314 where it is determined whether a maximum inactivity time has been reached. If a maximum inactivity time has been reached, control proceeds to state 312 where resources associated with the session are freed. If the maximum inactivity timeout has not been reached, control returns to state 302 where the session lifetime timer is reset and the states are repeated.

Figure 4:
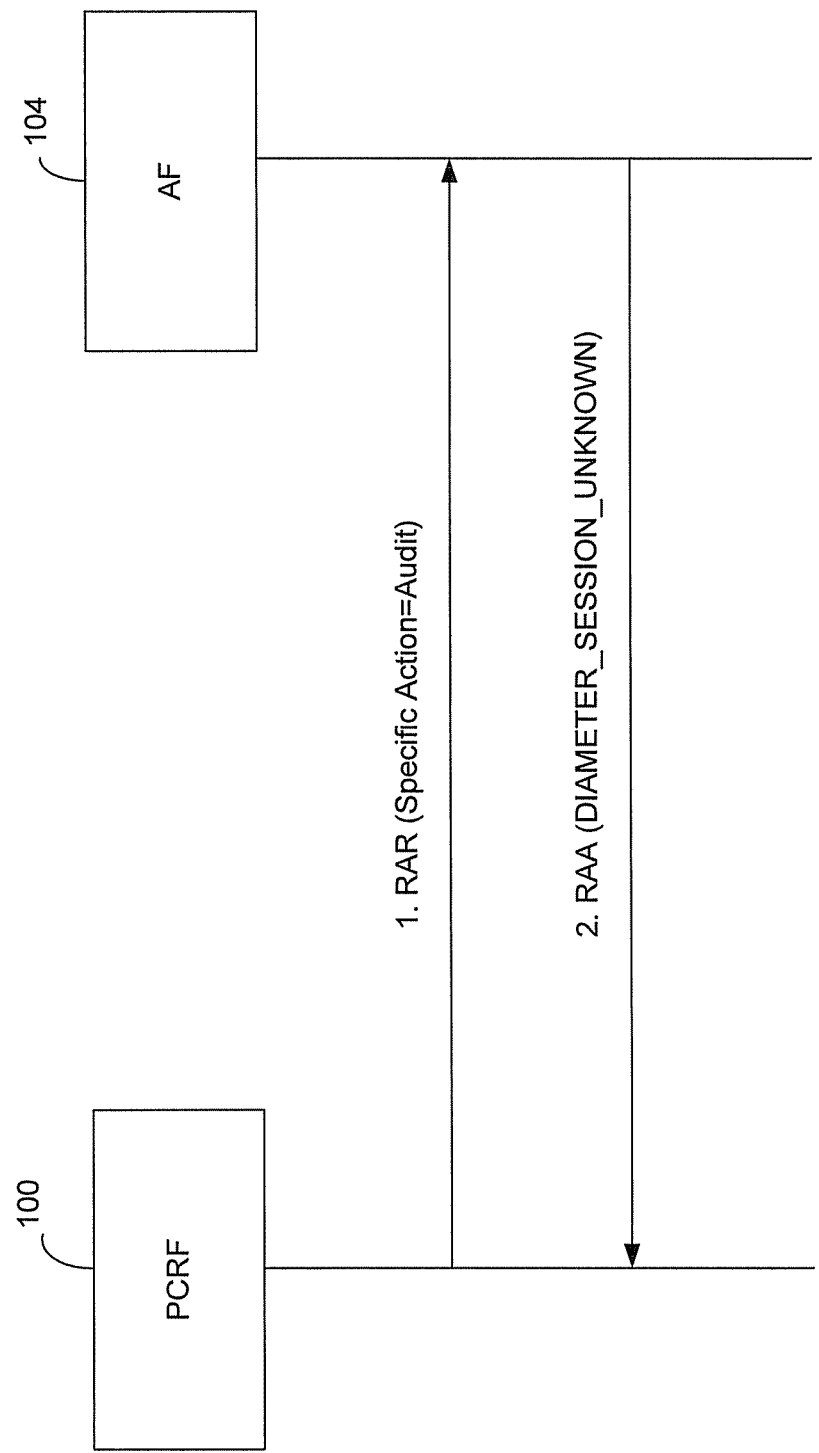
FIG. 4 is a message flow diagram illustrating exemplary messaging that may be exchanged between a PCRF and an AF in detecting orphan sessions on the Rx interface according to an embodiment of the subject matter described herein.

The subject matter described herein is not limited to auditing sessions on the Sy interface. PCRF 100 may also audit sessions on other interfaces, such as the Rx interface. FIG. 4 illustrates exemplary messages that may be exchanged between a PCRF and an AF in auditing sessions on the Rx interface. Referring to FIG. 4, in step 1, PCRF 100 sends a re-authorization request (RAR) message with a specific action of "audit". The RAR message may include a session ID that the PCRF 100 believes to be a valid session. In step 2, AF 104 receives the message and determines that the corresponding session is no longer active. Accordingly, AF 104 responds with a re-authorization answer (RAA) message with a parameter value indicating an unknown session identifier. PCRF 100, upon receipt of the message, frees its local resources associated with the session.

Figure 5:
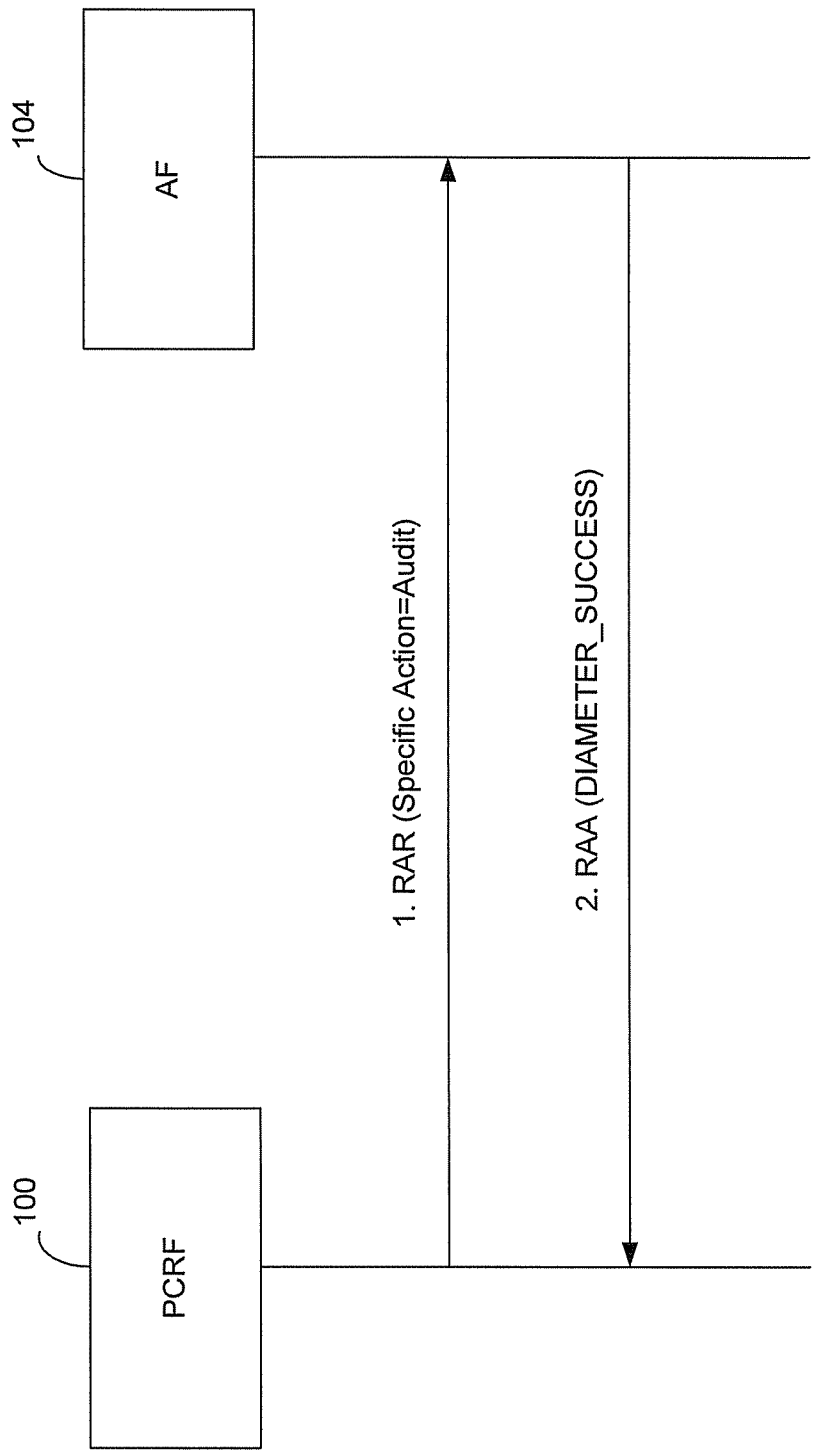
FIG. 5 is a message flow diagram illustrating further messaging that may be exchanged between the PCRF and the AF in detecting orphan sessions on the Rx interface according to an embodiment of the subject matter described herein.

FIG. 5 is a message flow diagram illustrating exemplary messaging between PCRF 100 and AF 104 for the case where the session is valid. Referring to FIG. 5, in step 1, PCRF 100 sends an RAR message with an audit parameter in the message. Upon receipt of the message, AF 104 identifies the audit parameter as triggering an audit and determines that the session ID corresponds to an active session. Accordingly, in step 2, AF 104 responds with a RAA message indicating DIAMETER_SUCCESS, which indicates to PCRF 100 that the session is still active. Upon receipt of such a message, PCRF 100 may maintain its local resources associated with the session.

Figure 6:
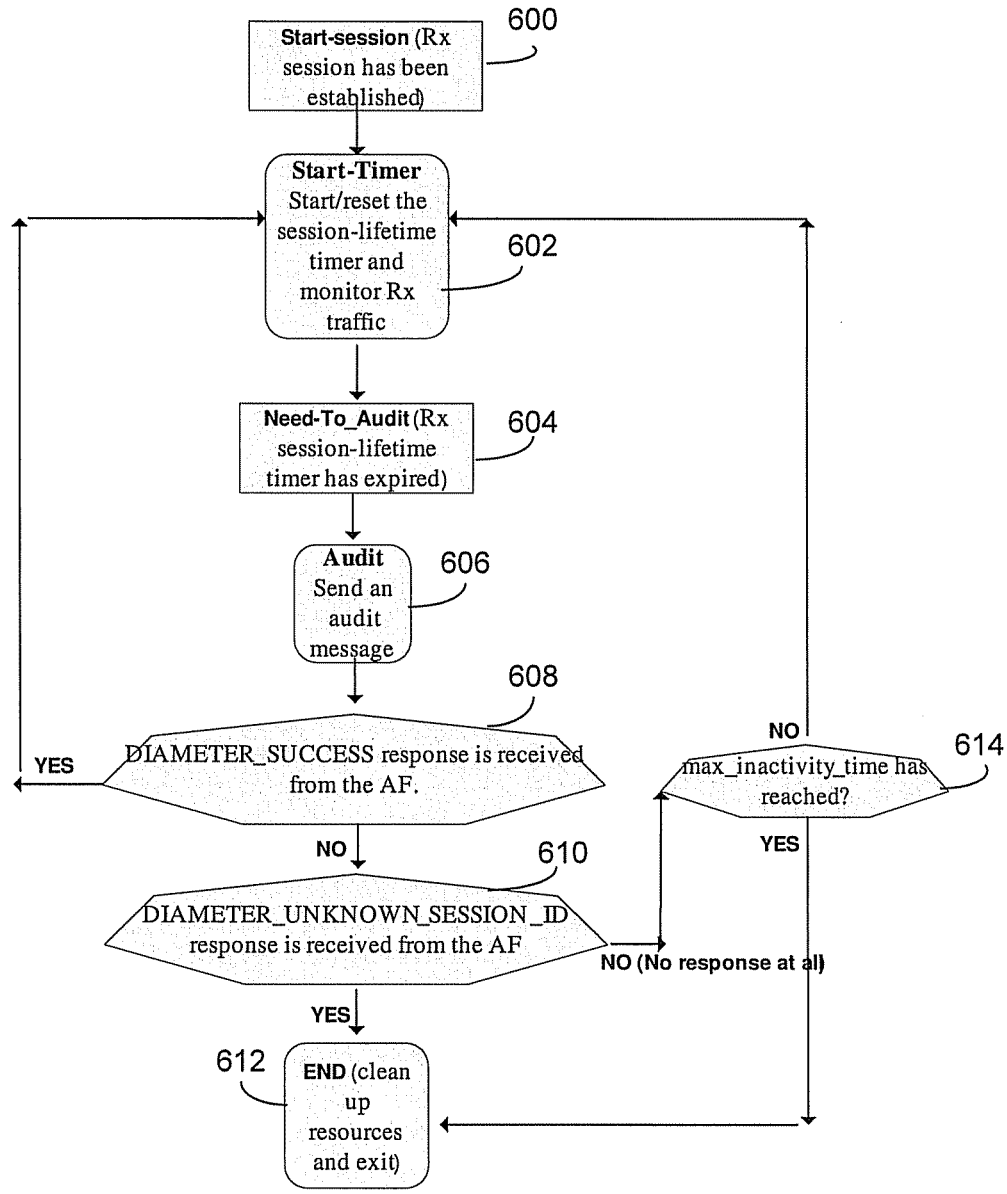
FIG. 6 is a state diagram illustrating exemplary states that may be implemented by the PCRF in detecting orphan sessions on the Rx interface according to an embodiment of the subject matter described herein.

FIG. 6 is a state diagram illustrating exemplary states that may be implemented by PCRF 100 in detecting orphan Rx sessions. Referring to FIG. 6, in state 600, PCRF 100 starts a session on the Rx interface. In state 602, PCRF 100 starts a session lifetime timer for the Rx session. When the session lifetimer expires, control proceeds to state 304 where PCRF 100 enters the need to audit state. In state 606, PCRF 100 sends an audit message to AF 104. As stated above, in one implementation, the audit message may be a re-authorization request message. From state 606, if an RAA message indicating that the session is valid is received from the AF, as indicated by state 608, control returns to state 602 where the session lifetime timer is reset. If, however, a message is received that indicates an unknown Diameter session ID is received from the AF, as indicated by state 610, control proceeds to state 612 where the PCRF frees its local resources associated with the Rx session. If no response is received at all, control proceeds to state 616 where it is determined whether a maximum activity timeout has been reached. If the timeout has been reached, control proceeds to state 612 where session resources associated with the session are freed. If the maximum activity timeout has not been reached, control returns to state 602 where the session lifetime timer is reset and the auditing process is repeated.

Figure 7:
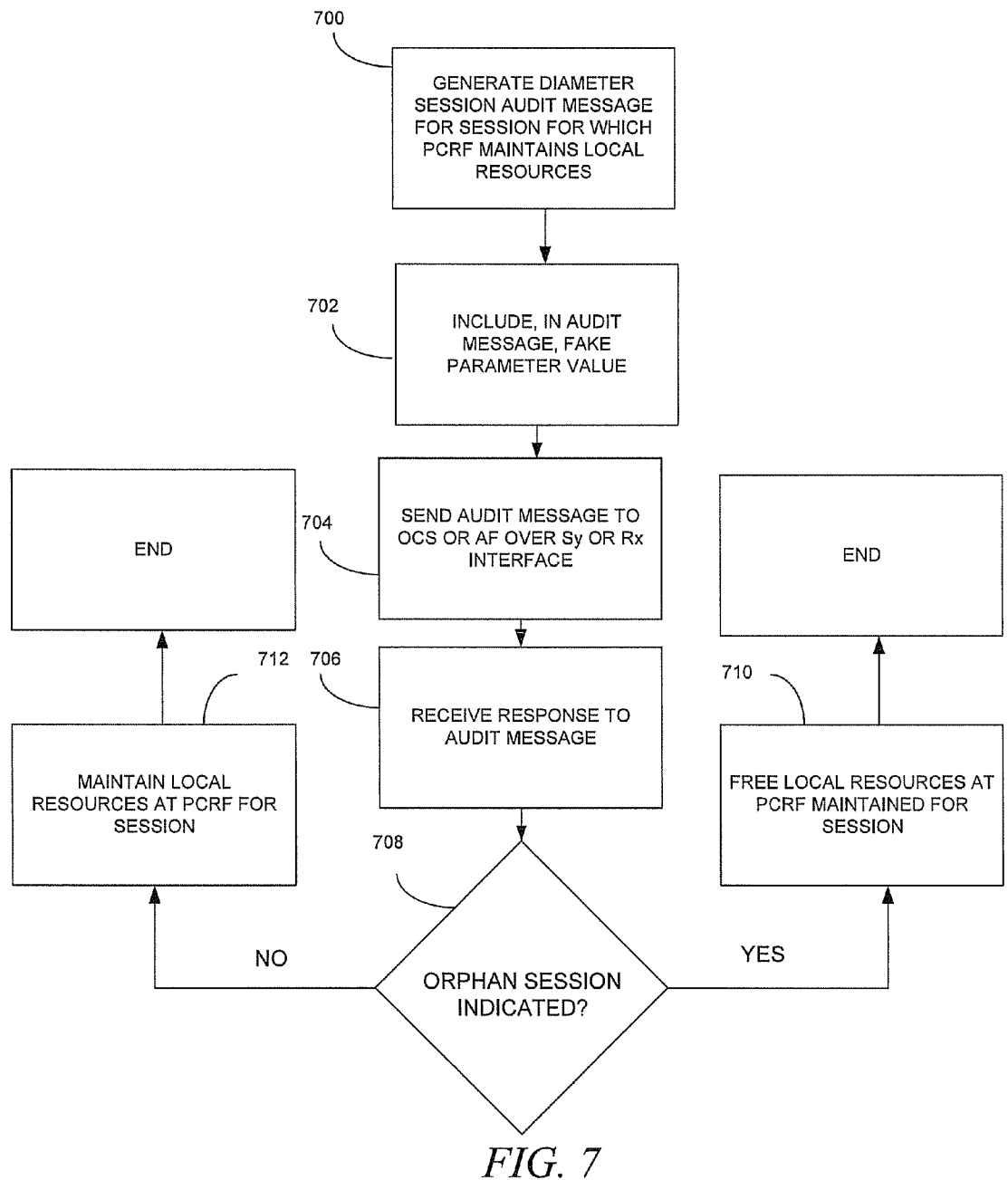
FIG. 7 is a flow chart illustrating exemplary steps performed by a PCRF in detecting orphan sessions on the Rx or Sy interfaces according to an embodiment of the subject matter described herein.

FIG. 7 is a flow chart illustrating exemplary overall steps that may be performed by PCRF 100 in detecting orphan Sy or Rx sessions using audit messages with fake parameters according to an embodiment of the subject matter described herein. Referring to FIG. 7, in step 700, the PCRF generates a Diameter audit message concerning an application level Diameter session for which the PCRF reserves local resources. For example, the session may be an Sy session or an Rx session that the PCRF believes to be active. In step 702, the PCRF includes, in the audit message, at least one fake parameter value. As stated above, the fake parameter value may be an out of range value for an existing parameter, a new parameter value, a null parameter value, or any other value that triggers the receiving node to identify the message as an audit message. In step 704, the PCRF sends the audit message with a fake parameter value to the OCS or the AF over an Sy or an Rx interface. For example, if the session is an Sy session, PCRF 100 may send a spending limit request message to the OCS over the Sy interface. If the session is an Rx session, the PCRF 100 may send a RAR message to the AF over the Rx interface.

In step 706, PCRF 100 receives a response to the audit message. In step 708, PCRF 100 determines whether the response indicates an orphan session. For example, PCRF 100 may receive a response indicating that the session is unknown. If this occurs, control proceeds to step 710 where resources associated with the session are freed. If, on the other hand, the response does not indicate an orphan session, control returns to step 700 where the session is reevaluated.

Figure 8:
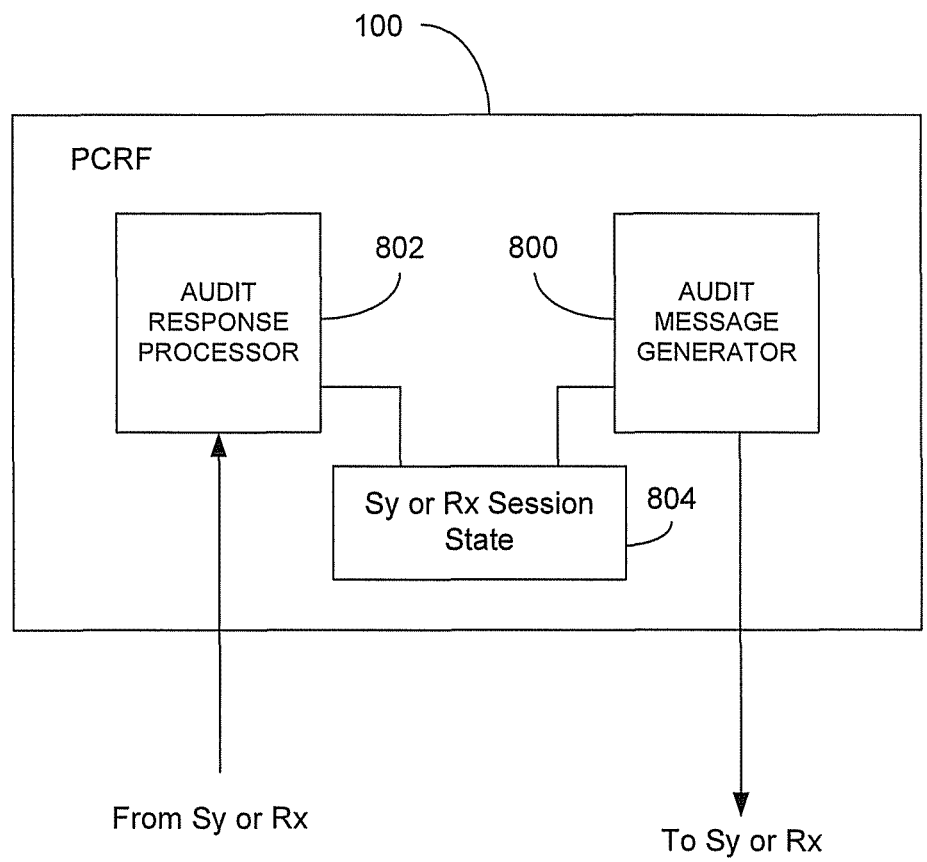
FIG. 8 is a block diagram illustrating an exemplary internal architecture for a PCRF according to an embodiment of the subject matter described herein.

FIG. 8 is a block diagram illustrating an exemplary architecture for a PCRF for detecting orphan sessions according to an embodiment of the subject matter described herein. Referring to FIG. 8, PCRF 100 includes a Diameter audit message generator 800 for generating audit messages regarding sessions that PCRF 100 believes to be active. Diameter audit message generator 800 may generate and insert fake parameter values in the audit messages, as described above. PCRF 800 also includes a Diameter audit response processor 802 for receiving responses to the audit messages and determining, based on the responses, whether the application level session comprises an orphan session. Diameter audit response processor 802 may free resources, such resources consumed by maintaining Sy or Rx session state 804, associated with the session in response to determining that the audit response indicates an orphan session. Diameter audit response processor 802 may also maintain resources associated with the session if the session is determined to be a valid session. It should be understood that PCRF 100 along with components 800 and 802 may implement any of the steps or states described herein for auditing Diameter Sy or Rx sessions.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for detecting orphan Sy sessions using audit messages with fake parameter values, the method comprising:
    at a policy and charging rules function (PCRF):
        generating a Diameter audit message concerning an application level Diameter session for which the PCRF reserves local resources, wherein the Diameter audit message comprises a message for subscribing to future updates in state regarding the session, wherein the application level Diameter session comprises an Sy session and wherein the Diameter audit message comprises a spending limit request message;
        including, in the audit message, at least one fake parameter value, wherein the fake parameter value is configured to trigger a response from an online charging system (OCS) to the audit message from which the PCRF can determine whether or not the session is an orphan session and to avoid triggering the OCS to send future updates regarding the session to the PCRF;
        sending the audit message with the fake parameter value to the OCS over an Sy interface;
        receiving a response to the audit message from the OCS;
        determining, based on the response, whether the session comprises an orphan session; and
        in response to determining that the session comprises an orphan session freeing the local resources maintained by the PCRF for the orphan session.

2. The method of claim 1 wherein the fake parameter value comprises a policy counter identifier out of range of policy counter identifiers expected by the OCS as normal for the session.

3. The method of claim 1 wherein upon initiation of a session, the PCRF sets an audit timer and wherein sending the Diameter audit message includes sending the Diameter audit message in response to expiration of the audit timer.

4. The method of claim 1 wherein determining, based on the response, whether the session is an orphan session includes identifying the response as indicating an orphan session if the response indicates that the session is unknown.

5. A system for detecting orphan Sy sessions using audit messages with fake parameter values, the system comprising:
    a policy and charging rules function (PCRF) including:
        a Diameter audit message generator for generating a Diameter message for auditing an application level Diameter session for which the PCRF maintains local resources for including, in the message, at least one fake parameter value, and for sending the message with the fake parameter value to an online charging system (OCS) over an Sy interface, wherein the Diameter audit message comprises a message for subscribing to future updates in state regarding the session, wherein the fake parameter value is configured to trigger a response by the OCS to the audit message from which the PCRF can determine whether or not the session is an orphan session and to avoid triggering the OCS to send future updates regarding the session to the PCRF, wherein the Diameter session comprises an Sy session and wherein the Diameter audit message comprises a spending limit request message; and
        a Diameter audit response processor for receiving a response to the spending limit request message from the OCS, for determining, based on the response, whether the application level session comprises an orphan session, and for, in response to determining that the application level Diameter session comprises an orphan session, freeing the local resources maintained by the PCRF for the orphan session.

6. The system of claim 5 wherein the fake parameter value comprises a policy counter identifier out of range of policy counter identifiers expected by the OCS as normal for the Diameter session.

7. The system of claim 5 wherein upon initiation of a session, the PCRF sets an audit timer and wherein sending the Diameter audit message includes sending the Diameter audit message in response to expiration of the audit timer.

8. The system of claim 5 wherein determining, based on the response, whether the session is an orphan session includes identifying the response as indicating an orphan session if the response indicates that the session is unknown.

9. A non-transitory computer readable medium having stored thereon executable instructions that when executed by a computer control the computer to perform steps comprising:
    at a policy and charging rules function (PCRF):
        generating a Diameter audit message concerning an application level Diameter session for which the PCRF reserves local resources, wherein the Diameter audit message comprises a message for subscribing to future updates in state regarding the session, wherein the application level Diameter session comprises an Sy session and wherein the Diameter audit message comprises a spending limit request message;
        including, in the audit message, at least one fake parameter value, wherein the fake parameter value is configured to trigger a response from an online charging system (OCS) to the audit message from which the PCRF can determine whether or not the session is an orphan session and to avoid triggering the OCS to send future updates regarding the session to the PCRF;
        sending the audit message with the fake parameter value to the OCS over an Sy interface;
        receiving a response to the audit message from the OCS;
        determining, based on the response, whether the session comprises an orphan session; and
        in response to determining that the session comprises an orphan session freeing the local resources maintained by the PCRF for the orphan session.

* * * * *